(12) United States Patent
Howard

(10) Patent No.: US 7,162,227 B2
(45) Date of Patent: *Jan. 9, 2007

(54) SIGNAL ROUTING FOR REDUCED POWER CONSUMPTION IN A CONFERENCING SYSTEM

(75) Inventor: Guy Howard, San Francisco, CA (US)

(73) Assignee: Polycom, Inc., Pleasanton, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 10/611,413

(22) Filed: Jul. 1, 2003

(65) Prior Publication Data

US 2004/0072598 A1    Apr. 15, 2004

(51) Int. Cl.
 H04M 3/42    (2006.01)
 H04B 3/00    (2006.01)

(52) U.S. Cl. .................. 455/416; 455/150.1; 381/77; 379/202.01

(58) Field of Classification Search ................ 455/416, 455/150.1, 306, 343, 574; 381/77, 99; 379/202.01
See application file for complete search history.

(56) References Cited

U.S. PATENT DOCUMENTS

| | | | |
|---|---|---|---|
| 4,434,508 A | 2/1984 | Sommer | |
| 4,610,024 A | 9/1986 | Schulhof | |
| 4,669,108 A | 5/1987 | Deinzer | |
| 4,829,500 A | 5/1989 | Saunders | |
| 5,138,651 A | 8/1992 | Sudo | |
| 5,351,381 A | 10/1994 | Case | |
| 5,432,858 A | 7/1995 | Clair | |
| 5,530,770 A | 6/1996 | Kim | |
| 5,596,648 A | 1/1997 | Fast | |
| 5,598,480 A | 1/1997 | Kim | |
| 5,602,922 A | 2/1997 | Lee | |
| 5,668,884 A | 9/1997 | Clair | |
| 5,708,719 A | 1/1998 | Greenberger | |
| 5,751,818 A | 5/1998 | Gertz | |
| 5,768,399 A | 6/1998 | Statham | |
| 5,832,024 A | 11/1998 | Schotz | |
| 5,864,626 A | 1/1999 | Braun | |
| 5,881,156 A | 3/1999 | Treni | |
| 5,930,370 A | 7/1999 | Ruzicka | |
| 5,946,343 A | 8/1999 | Schotz | |
| 5,978,658 A | 11/1999 | Shoji | |
| 6,115,475 A | 9/2000 | Alexander | |
| 6,587,682 B1 * | 7/2003 | Howard | 455/416 |

OTHER PUBLICATIONS

Search Report received in corresponding European Application No. EP 02 74 7805 dated Jul. 31, 2006. NOTE: US4669108 is noted in the foreign search report but was previously disclosed to the USPTO and therefore isn't being referenced again.

* cited by examiner

Primary Examiner—Lana Le
Assistant Examiner—Adeel Haroon
(74) Attorney, Agent, or Firm—Wong, Cabello, Lutsch, Rutherford & Brucculeri LLP

(57) ABSTRACT

A technique is provided for reducing power consumption of an internally powered console in an audio system through frequency based signal routing. A system employing the technique includes a base unit having an interface for receiving a signal representative of acoustic information. The base unit includes a filter system for splitting the signal into low-frequency and high-frequency component signals. The low-frequency signal is routed to a first audio driver for reproduction. The high-frequency signal is routed to a device that includes a second audio driver. By removing the need to reproduce the low-frequency portion of the acoustic information, the power consumption of the device is reduced.

17 Claims, 5 Drawing Sheets

SIGNAL ROUTING FOR REDUCED POWER CONSUMPTION IN A CONFERENCING SYSTEM

BACKGROUND

1. Field of the Invention

The present invention relates generally to audio reproduction, and more particularly to reduction of power consumption in audio conferencing system components through frequency filtered signal routing.

2. Description of the Prior Art

Audio conferencing systems have become an increasingly popular and valuable business communications tool. Conferencing systems are often connected to a network, such as the public-switched telephone network, and are thus being utilized to facilitate natural communication between persons or groups of persons located remotely from each other.

Enterprise conference or meeting rooms are typically configured with conferencing systems, often with an audio console being the centerpiece of the conference table. Configuring a conference room as such maximizes the pick-up range of the integrated microphones to efficiently capture as much of the local speech as possible, and maximizes the audible range of the audio reproduced by the integrated speakers. Configuring a conference room with a conferencing system which has one or more audio consoles located on one or more conference tables has an inherent disadvantage when utilizing a "wired" system because connecting cables must be routed from a power source to the table-top console and possibly among various table-top consoles or other system components. Therefore, there is a need for a wireless conferencing system.

A wireless conferencing system may be configured with either all components being battery or otherwise internally powered, or possibly with some components being internally powered and a main unit being externally powered. Development of a wireless conferencing system must overcome the ever-present trade-off between power supply/availability and system component/battery size.

In addition, components of a wired conferencing system employed in a large conference room may be "daisy-chained" or connected in series. Power availability in such a system configuration needs addressing since the power supply and the cables connecting the system components must provide enough power to supply the entire series arrangement.

In addressing the power issues in both wireless and wired conferencing systems, one possible solution is to offer more power to system components. This is not an optimal solution, especially in a wireless system including battery-powered components. An alternative solution, which is additionally needed in the art, is a system and method for reducing power consumption in an audio conferencing system.

SUMMARY

Systems and methods are provided for reducing power requirements of an internally powered console in a wireless networked conferencing system. The system includes a base unit having a network interface for receiving an signal representative of speech or other acoustic information from a remote conference endpoint. The base unit includes a filter system for splitting the signal into low-frequency component and high-frequency component signals. The low-frequency component signal is routed over an electrical connection to a first audio driver for reproduction of the low-frequency portion of the acoustic information. The high-frequency component signal is routed to a transmitter, which encodes the signal for transmission over a wireless channel to the internally powered console. The console includes a receiver for receiving and decoding the high-frequency component signal and a second audio driver, coupled to the receiver, for reproducing the high-frequency portion of the acoustic information. By removing the need to reproduce the low-frequency portion of the acoustic information, the console's power consumption is reduced and battery life is correspondingly lengthened. The base unit may additionally include a delay module for delaying the low-frequency component signal relative to the high-frequency component signal in order to localize the conference participants' attention to the console.

The power requirement reduction technique described is equally applicable to externally powered audio reproduction components that may benefit from reduced power requirements, and audio systems other than conferencing systems, in which audio drivers are internally powered.

DETAILED DESCRIPTION OF EMBODIMENTS

Figure 1:
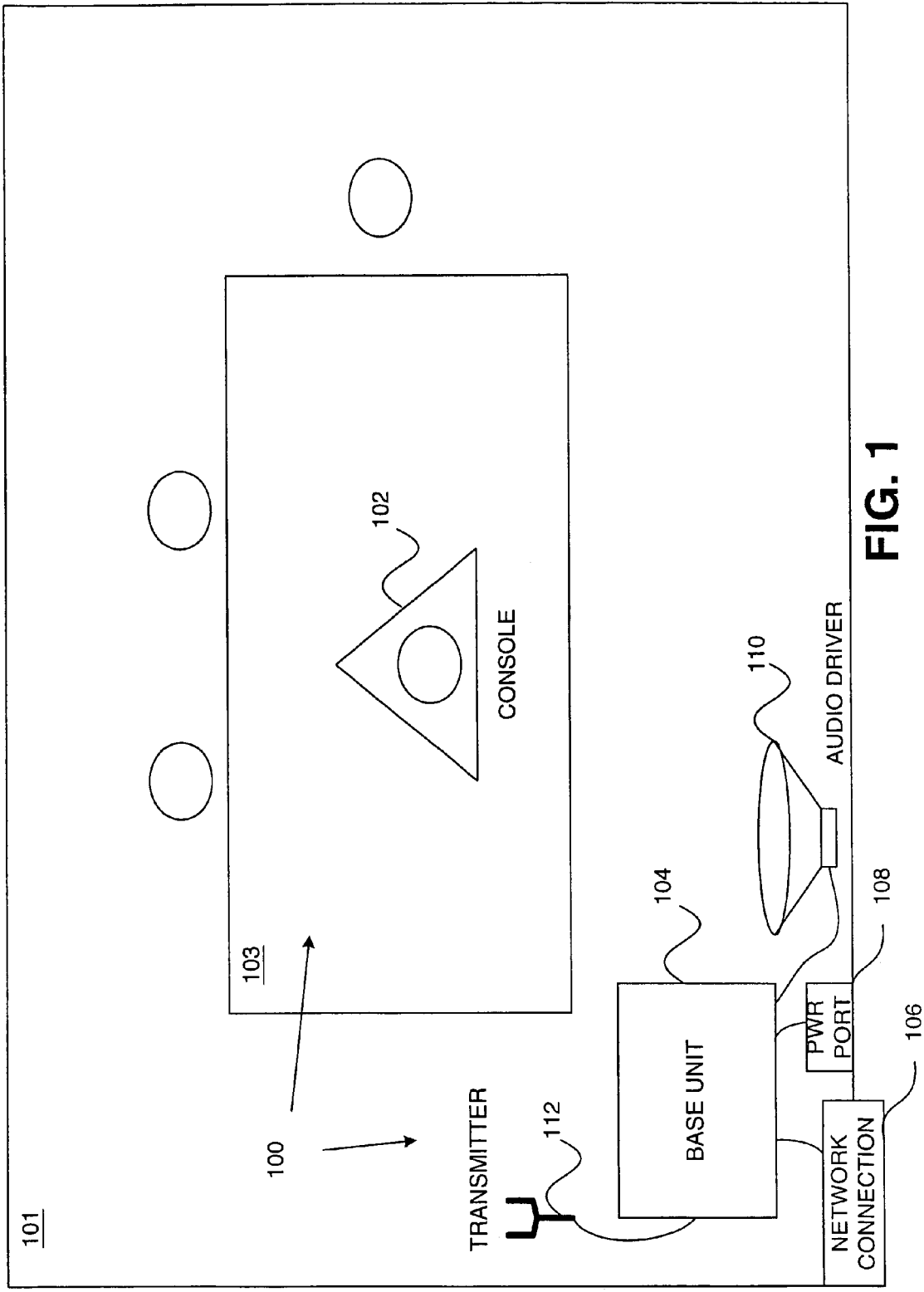
FIG. 1 depicts an exemplary operating environment of a system and method for reducing power consumption in components of an audio conferencing system through selective signal routing, in accordance with an embodiment of the invention.

FIG. 1 depicts an exemplary operating environment of a system and method for reducing power consumption in components of an audio conferencing system through selective signal routing, according to an embodiment of the invention. The depiction is essentially a top view of an exemplary audio conferencing system (ACS) 100 located in a conference room 101. A wireless ACS 100 is utilized in the embodiment shown and described in reference to this figure.

The ACS 100 includes a console 102 (depicted on a table 103) which is powered by an internal battery or other local power source, and a base unit 104. Sub-system components of console 102 are described in reference to FIG. 4 and sub-system components of base unit 104 are described in reference to FIG. 2. Base unit 104 is provided with a network connection port 106 for connecting to a network. The system and methods described herein are network independent, but exemplary networks include a circuitswitched network such as the public-switched telephone network (PSTN), a packet-switched network such as the Internet, or an Integrated Services Digital Network (ISDN). The network connection port 106 serves as the communication interface between the base unit 104 and the network, thus providing the capability to exchange signals with remote parties via the network. The signals typically represent the speech originating from conference participants at the local endpoint (conference room 101) and from remote endpoints (not shown) connected to and communicating through the network.

The base unit 104 is preferably provided with a power port 108 for connecting to a power source, such as an electrical wall socket, in conference room 101. Alternative embodiments of the base unit 104 may utilize external power sources other than a wall socket, or may utilize an internal power source such as a battery. The base unit 104 is further provided with an internal or external audio driver 110, commonly referred to as a speaker, for producing sound from an signal. A preferred ACS 100 functions in a manner such that the base unit 104 is utilized to produce the lower end of the audio frequency spectrum, whereas the console 102 is utilized to produce the higher end of the spectrum. Finally, the base unit 104 is also provided with a transmitter 112, the function of which is described in more detail in reference to FIG. 2. Thus, due to the amount of energy required to produce the low frequency audio reproduction and to drive the transmitter 112, the base unit 104 is preferably externally powered.

Figure 2:
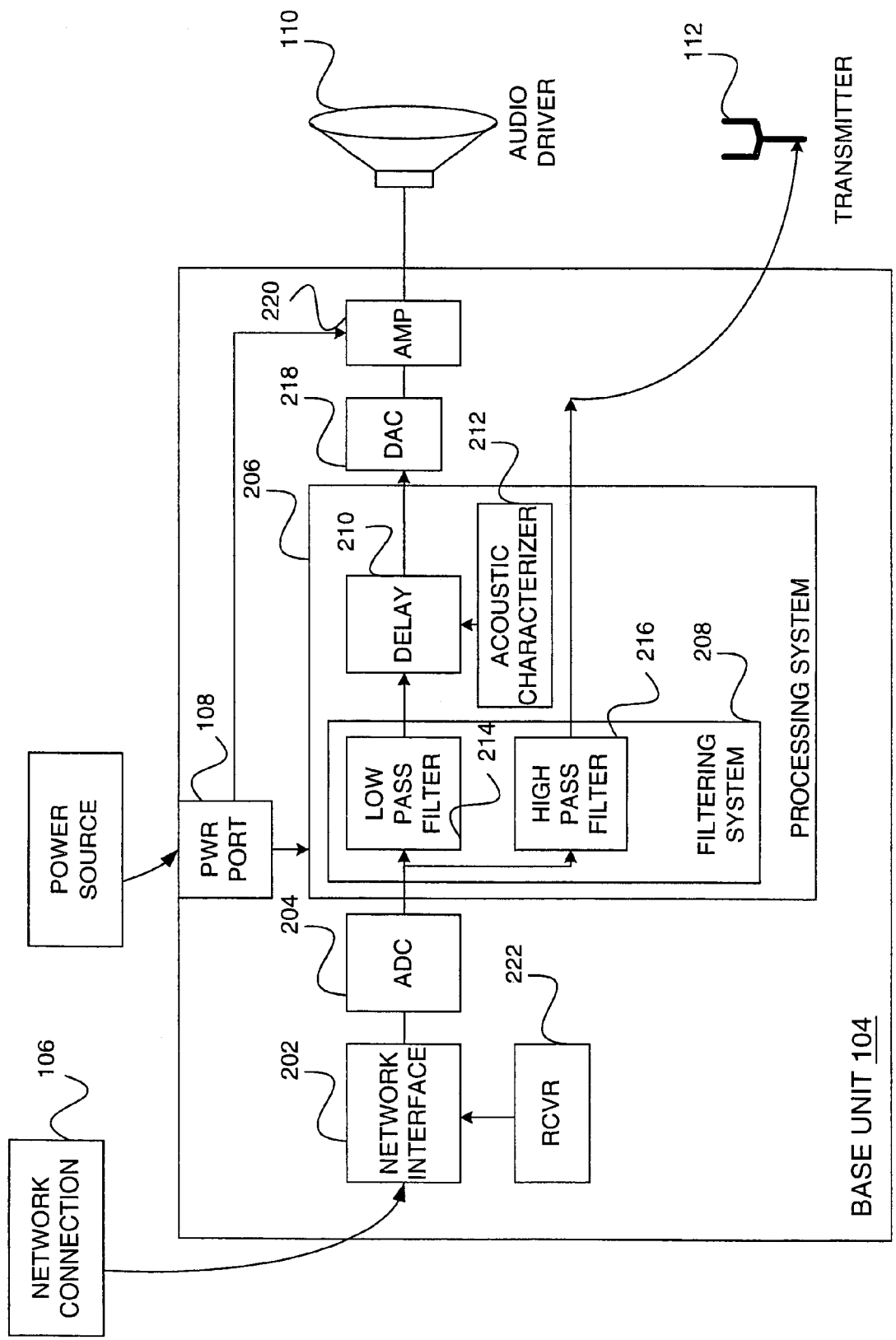
FIG. 2 depicts an exemplary architecture of a base unit of a wireless audio conferencing system such as that depicted in FIG. 1, in accordance with an embodiment of the invention.

FIG. 2 depicts an exemplary architecture of the base unit 104 of a wireless ACS 100 (FIG. 1), which preferably functions as the hub of the ACS 100. The base unit 104 is depicted as an externally powered unit as in FIG. 1, but an internally powered unit is also contemplated and within the scope of the present invention. The base unit 104 is connected to the network connection 106 through a network interface 202, such as a conventional network interface circuit, and preferably to an external power source through a power port 108.

An analog signal representing audio that is received through the network interface 202 routes through an analog-to-digital codec (ADC) 204 in order to convert the analog signal into a digital signal. Note that if the network connection 106, network interface 202, and network (e.g., a LAN utilizing technology such as Ethernet, or a WAN such as the Internet) are digital signal based, then it is not necessary to convert an analog signal to a digital signal as described above in reference to the ADC 204. The digital signal is passed to a processing system 206, such as a digital-signal processor (DSP), for processing in accordance with embodiments of the invention and as described below. The processing system 206 comprises at least a filtering system 208, a delay means 210, and an acoustic characterizer 212. The filtering system 208 comprises a low pass filter 214 and a high pass filter 216.

Upon engagement with the filtering system 208, the signal is bifurcated into a low frequency band signal and a high frequency band signal through a standard implementation of a high-order cross-over function. The low pass filter 214 is operative to pass the low frequency signal to the delay means 210. A preferred cross-over frequency of the filtering system 208 is approximately 400 Hertz, but may vary and still fall within the scope of the present invention. The delay means 210 is operative to delay the low band signal to the audio driver 110 of the base unit 104, in order to provide an "imaging" function to the console 102 (FIG. 1). By delaying the low band signal (which audio information is reproduced by the audio driver 110 of base unit 104) in relation to the high band signal (which audio information is reproduced by console 102), a listener is likely to "image" (i.e., direct ones attention and vision) upon the console 102 as opposed to the base unit 104, since audio precedence has a significant localizing influence. Focusing listeners' attention to the table 103 (FIG. 1) area as opposed to the location of the base unit 104 (e.g., a wall or corner of room 101 of FIG. 1) is a preferred scenario in audio conferencing systems and applications.

The delay duration is adjustable and is selected based on information generated by the acoustic characterizer 212, which is operative to characterize the acoustic response of a room or other operating environment based on known active or passive analysis of acoustic signals. The signal delay provided by the delay means 210 is preferably effected in the digital domain, and is preferably on the order of but not limited to 5 milliseconds. The delay means 210 preferably utilizes conventional methods for providing digital signal delay, such as software or firmware code executing digital delay algorithms by an integrated circuit or other form of processor.

After being delayed by the delay means 210, the low band signal is converted into an analog signal by a digital-to-analog codec (DAC) 218 and amplified by a conventional amplifier 220. The amplified low band signal is transmitted to the audio driver 110 for conversion to and presentation of audible sound.

Referring back to the cross-over function of filtering system 208, the high band signal is provided by operation of the conventional high pass filter 216. The high band signal is routed to the transmitter 112 for wireless transmission to the console 102 (FIG. 1) for processing and presentation, as described in reference to FIG. 4. A number of conventional wireless data transmission methods may be utilized by the transmitter 112 to transmit the high band and/or control signals to the console 102, such as RF signals, infrared signals, or other signals in a suitable part of the spectrum. In addition, the base unit 104 is configured with a receiver 222 for receiving signals representing audio information captured by and transmitted from the console 102.

Figure 3:
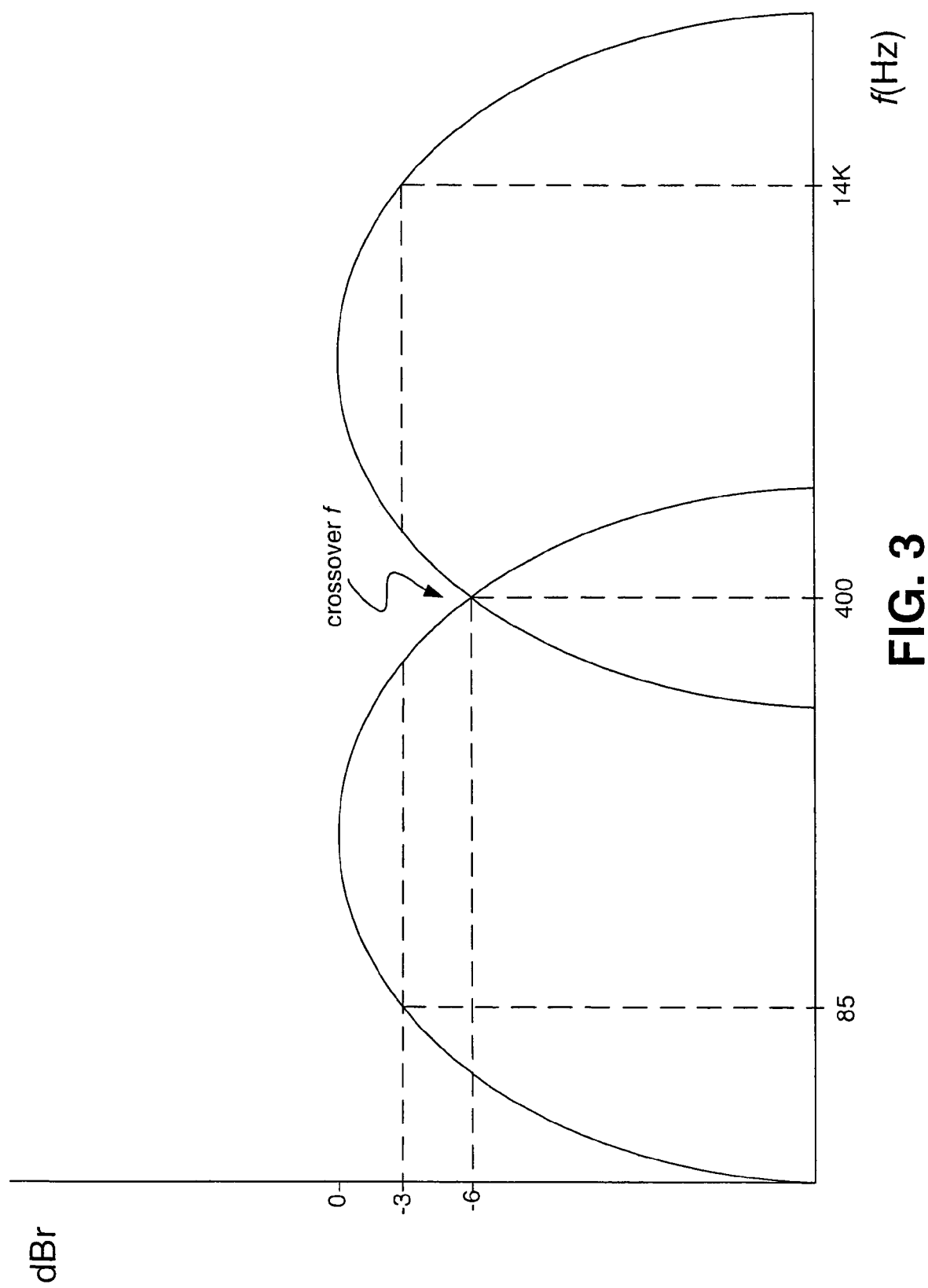
FIG. 3 depicts exemplary frequency response curves of an audio conferencing system provided by the systems and methods described herein, in accordance with an embodiment of the invention.

FIG. 3 depicts exemplary, but not limiting, frequency response curves of the ACS 100 (FIG. 1) provided by the systems and methods, described herein, in accordance with a preferred embodiment. In this depiction, the left curve represents the frequency response of the base unit 104 audio driver 110, and the right curve represents the frequency response of the console 102 audio driver 416 (see FIG. 4). In this embodiment, the cross-over frequency of the filtering system 208 is approximately 400 Hertz at −6 decibels. As depicted, the ACS 100 frequency response is shown with a low cut commencing at approximately 70 Hertz, employed to minimize distortion in the sound presented by the audio driver 110 (FIGS. 1 and 2) of the base unit 104 (FIGS. 1 and 2). Additionally, the ACS 100 frequency response is depicted with a high cut to minimize the power used by the console 102 to produce inaudible or noise frequency bands.

Figure 4:
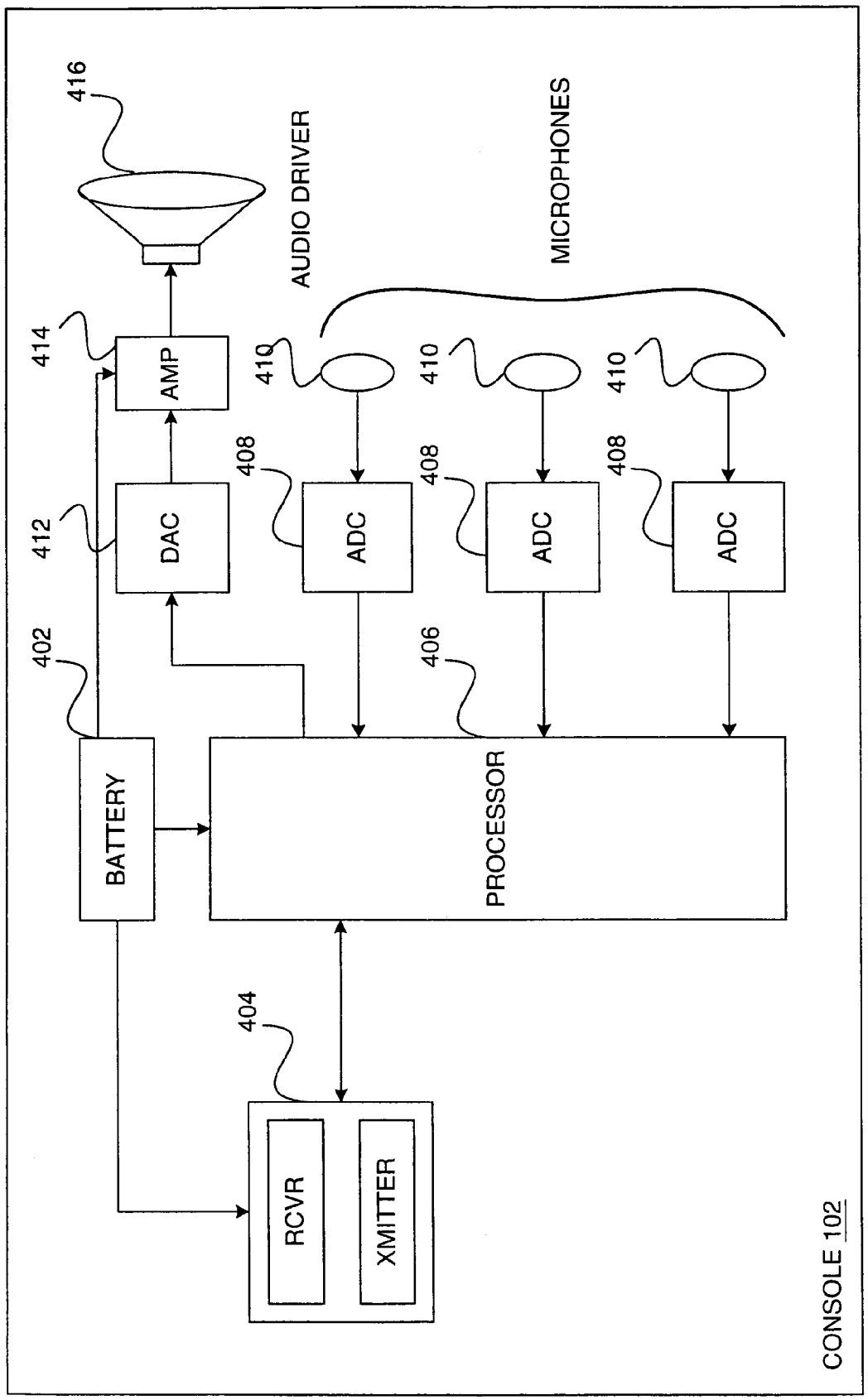
FIG. 4 depicts an exemplary architecture of a console of a wireless audio conferencing system such as that depicted in FIG. 1, in accordance with an embodiment of the invention.

FIG. 4 depicts an exemplary architecture of the console 102 of a wireless ACS 100 (FIG. 1). Being a wireless unit in the preferred embodiment, the console 102 is depicted with a battery 402, for providing power to at least a transceiver 404, a processor 406, and an amplifier 414. Alternative internal power sources may be provided in the console 102 and still fall within the scope of the invention. The transceiver 404 is operative to receive the high band audio signals and various control signals from the base unit 104 (FIGS. 1 and 2), as described above in reference to FIG.

2. In addition, the transceiver 404 is configured to transmit signals representing local (from within room 101 of FIG. 1) audio from the console 102 to the receiver 222 (FIG. 2) of base unit 104 for transmission to the network through the network interface 202 (FIG. 2). An alternative embodiment may employ triple diversity in the transceiver configuration, wherein three antennas are utilized and signals are sampled from each, and the antenna with the best signal strength is used as the active antenna.

The transceiver 404 is coupled to the processor 406 whereby the coupling facilitates transmission of signals therebetween. In embodiments wherein the base unit 104 transmits command signals to the console 102, or in embodiments wherein signals other than the audio signals are transmitted between the base unit 104 and the console 102, a multiplexer (MUX) and/or demultiplexer (DEMUX) (not shown) may be coupled to the transceiver 404 and the processor 406, or may be a sub-component of the processor 406.

The processor 406 is capable of performing a number of functions, including for example, acoustic echo cancellation, management of RF or other transmission signals (which may include timing the data flow on the RF signal in a time-division multiplexing scheme), power management, and the like. Next, the console 102 further comprises at least one analog-to-digital codec (ADC) 408 and a digital-to-analog codec (DAC) 412. Each ADC 408 is configured for converting analog signals representing audio received from at least one microphone 410. If a multiple microphone 410 configuration is employed, a summing device (not shown) may be utilized to sum the multiple signals from the microphones 410. Alternative microphone 410 and ADC 408 configurations are contemplated and still within the scope of the invention, such as summing the microphone signals prior to converting to digital format and thus employing a single ADC 408, or configuring the processor 406 to perform the functionality of the ADC 408.

The processor 406 is further operative to transmit digital audio data to the DAC 412 for conversion to analog format. Again, the DAC 412 functionality may be included in the processor 406 and remain within the scope of the invention. The analog signal is sent to the conventional amplifier 414 for amplification whereby the amplified high band signal is then transmitted to an audio driver 416, configured for producing sound from the signal.

Having described the configuration and functionality of the console 102 and the base unit 104, it can be appreciated that by selectively routing signals based on audio frequency, an audio conferencing system such as ACS 100 can perform with reduced power consumption by the battery (or other internal power source) powered console, i.e., console 102. The reduction in power consumption by the console 102 is effected by routing a defined frequency band away from the internally powered console 102 and to the externally powered base unit 104 audio driver 110, thus reducing the amount of power necessary for the console 102 audio driver 416 to produce its acoustical output. Reducing power consumption results in a system that is more efficient than prior art audio systems in terms of internal power requirements of the console 102, and thus also results in a spatially efficient console 102 through reduction in battery 402 size.

It is additionally contemplated that the frequency based signal routing techniques described herein can benefit audio systems and environments other than audio conferencing systems. One non-limiting example is the benefit offered a home stereo or theater system that includes wireless speakers. Those skilled in the audio art can recognize other implementations of the power reduction techniques described herein that would benefit from utilization thereof.

An alternative embodiment of an ACS 100 (FIG. 1) may utilize two or more consoles 102 per table 103 (FIG. 1), wherein each console 102 represents a separate audio channel for the respective microphones 410 and audio drivers 416. An additional embodiment is contemplated wherein each console 102 may be configured with a low duty cycle processor 406 for acoustic echo cancellation, etc. In such a configuration, the processor 406 is intermittently powered on and off as opposed to remaining constantly powered, thus contributing to the minimization of power usage by the console 102.

Figure 5:
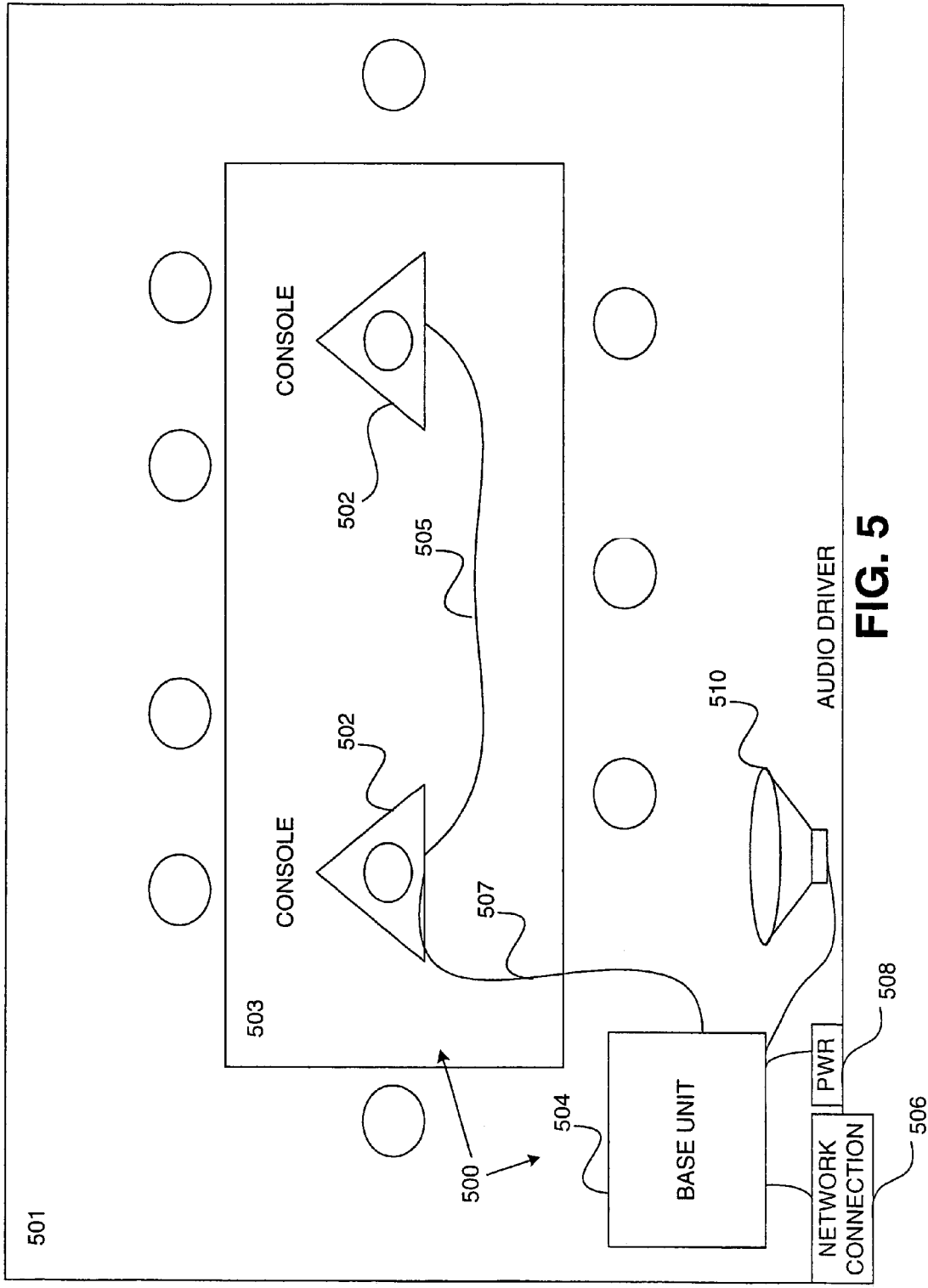
FIG. 5 depicts a second exemplary operating environment of a system and method for reducing power consumption in components of an audio conferencing system-through selective signal routing, according to an embodiment of the invention.

FIG. 5 depicts an exemplary operating environment of a system and method for reducing power consumption in components of an audio conferencing system through selective signal routing, according to another embodiment of the invention. The depiction is essentially a top view of an exemplary audio conferencing system (ACS) 500 located in a conference room 501. An externally powered, or wired, ACS 500 is utilized in the embodiment shown and described in reference to this figure.

The ACS 500 includes at least one console 502 (with two consoles 502 depicted on a table 503) and a base unit 504, both of which are powered by an external power source. Sub-system components of console 502 are similar to the components of console 102 (FIG. 4), with the exception of the battery 402 and transceiver 404 (FIG. 4). Sub-system components of base unit 504 are similar to those of base unit 104 (FIG. 2), with the exception of the transmitter 112 and the receiver 222 (FIG. 2). The consoles 502 are coupled together by a cable 505 to transport, for example, power, command, and audio signals between the consoles 502.

Base unit 504 is provided with a network connection port 506 for connecting to a network. The network connection port 506 serves as the communication interface between the base unit 504 and the network, thus providing the capability to exchange signals with remote parties via the network. In addition, the base unit 504 and one of the consoles 502 are coupled together by a cable 507 to transport, for example, power, command, and audio signals between the base unit 504 and the consoles 502.

The base unit 504 is preferably provided with a power port 508 for connecting to a power source, such as an electrical wall socket, in conference room 501. Alternative embodiments of the base unit 504 may utilize external power sources other than a wall socket, or may utilize an internal power source such as a battery. The base unit 504 is further provided with an internal or external audio driver 510, commonly referred to as a speaker. The ACS 500 depicted functions in a manner similar to the ACS 100 (FIG. 1) in that the base unit 504 is utilized to produce the lower end of the audio frequency spectrum, whereas the consoles 502 are utilized to produce the higher end of the spectrum.

FIG. 5 is used to depict a wired ACS 500 configuration and to describe the advantages that utilization of the techniques described herein offers a wired audio system. In a wired ACS 500, the amount of power consumed by console 502 remains an important system design parameter and thus the invention described herein consequently offers advantages when employed in a wired system. A wired audio conferencing configuration that would benefit from implementation of embodiments of this invention is one in which several consoles 502 are connected in series, or daisy-chained. Such a system configuration requires power consumption efficiency because the total current requirement of the consoles 502 is additive. Thus, implementing the techniques described herein would result in smaller, and thus cheaper and more user-friendly, cables 505 and 507. Another example of benefits provided to a wired ACS 500 is extended low frequency, or bass, response from the base unit 504. It is noteworthy that with an externally powered console 502, the cross-over frequency would preferably be different than that exemplified above with respect to the wireless ACS 100.

It will be recognized by those skilled in the art that while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications and that its scope is limited only by the claims appended hereto.

What is claimed is:

1. A wireless networked conferencing system, comprising:
    a base unit, including a network interface for receiving a signal representative of acoustic information from a remote endpoint over a network, and further including a filter system for filtering the received signal to produce a high-frequency component signal and a low-frequency component signal;
    a transmitter, coupled to the filter system, for transmitting the high-frequency component signal over a wireless channel; and
    a console, including a console receiver for receiving the high-frequency component signal transmitted over the wireless channel, and further including an audio driver, coupled to the receiver, for reproducing the acoustic information represented by the high-frequency component signal;
    whereby power consumption of the audio driver is reduced by eliminating the need to reproduce the low-frequency component signal of the acoustic information by the audio driver.

2. The system of claim 1, further comprising a delay module, coupled to the filter system, for delaying by a delay duration the low-frequency component signal relative to the high-frequency component signal.

3. The system of claim 2, wherein the delay duration is approximately 5 milliseconds.

4. The system of claim 2, wherein the delay duration is adjustable.

5. The system of claim 4, wherein the delay duration is selected based on an acoustic response characterization of a room.

6. The system of claim 2, wherein the filter system and the delay module are embodied in a digital processor.

7. The system of claim 6, wherein the base unit further includes a codec, for digitizing the signal for processing by the digital processor.

8. The system of claim 1, wherein the filter system includes:
    a high-pass crossover filter, for outputting the high-frequency component signal; and
    a low-pass crossover filter, for outputting the low-frequency component signal.

9. The system of claim 8, wherein a crossover frequency associated with the high-pass crossover filter and the low-pass crossover filter is approximately 400 hertz.

10. The system of claim 1, wherein the console further includes:
    at least one microphone, for generating a local signal representative of local acoustic information; and
    a console transmitter, coupled to the microphone, for transmitting the local signal over a second wireless channel to a base receiver coupled to the base unit.

11. The system of claim 10, wherein the at least one microphone is coupled to the console receiver via a processor configured to perform an echo cancellation process on the local signal.

12. A networked conferencing system, comprising:
    a base unit, including a network interface for receiving a signal representative of acoustic information from a remote endpoint over a network, and further including a filter system for filtering the received signal to produce a high-frequency component signal and a low-frequency component signal; and
    a console, electrically coupled to the base unit and located separate therefrom, the console including an audio driver for reproducing the acoustic information represented by the high-frequency component signal;
    whereby power consumption of the audio driver is reduced by eliminating the need to reproduce the low-frequency component signal of the acoustic information by the audio driver.

13. The system of claim 12, further comprising a delay module coupled to the filter system, for delaying the low frequency component signal relative to the high frequency component signal.

14. A method for reducing power consumption of a console in a conferencing system, comprising the act of:
    receiving a signal representative of acoustic information from a remote endpoint;
    filtering the received signal to produce a high-frequency component signal and a low-frequency component signal;
    transmitting the high-frequency component signal over a wireless channel;
    receiving, at the console, the high-frequency component signal transmitted over the wireless channel; and
    reproducing the acoustic information represented by the high frequency component signal at an audio driver located at the console.

15. The method of claim 14, further comprising the act of delaying the low-frequency component signal relative to the high-frequency component signal by a delay duration.

16. The method of claim 15, further comprising the act of adjusting the delay duration in accordance with measured acoustic response characteristics of an environment in which the system is located.

17. A method for reducing power consumption of an internally powered audio device of an audio system, comprising the acts of:
    filtering a received signal to produce a high-frequency component signal and a low-frequency component signal;
    transmitting the high-frequency component signal over a wireless channel to the internally powered audio device; and
    reproducing acoustic information represented only by the high frequency component signal at an audio driver located at the internally powered audio device,
    the reproducing thereby reducing the power requirement of the internally powered audio device by eliminating the need to reproduce predefined frequencies of the signal at the audio driver.

* * * * *